June 29, 1948. J. ROSAN 2,444,145
INSERT AND USE OF SAME
Filed May 24, 1943 3 Sheets-Sheet 1
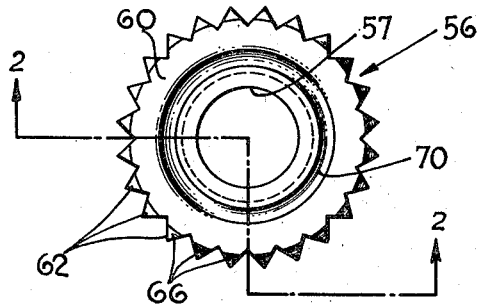
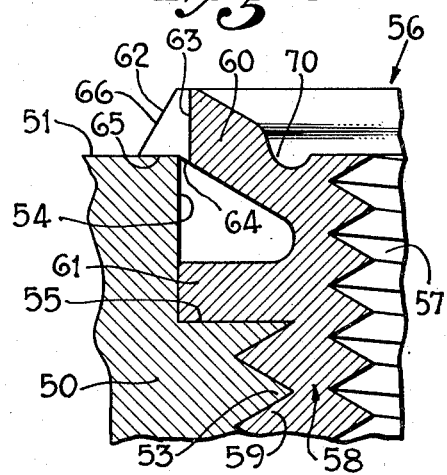
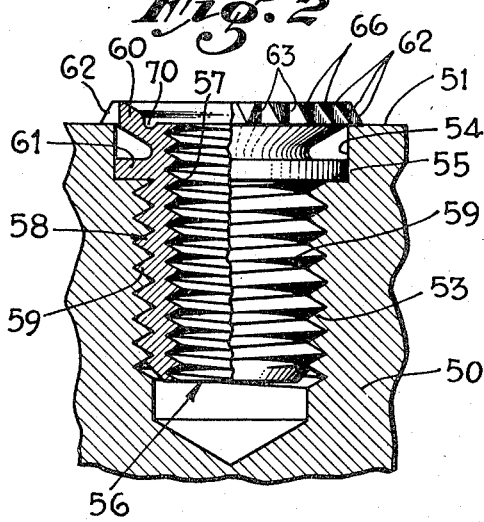
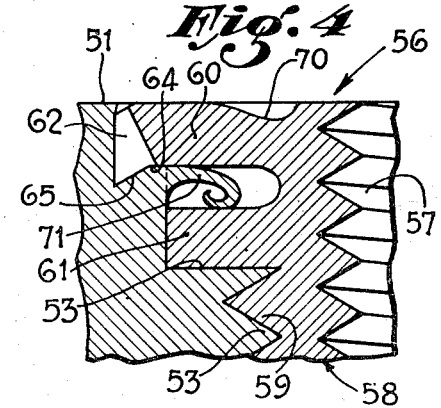
Inventor:
JOSEPH ROSAN,
By
Attorney.

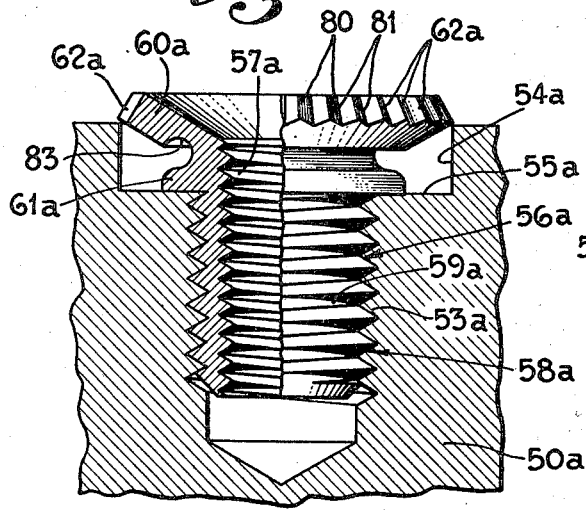
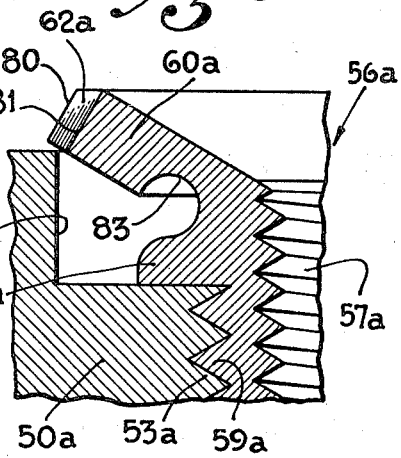
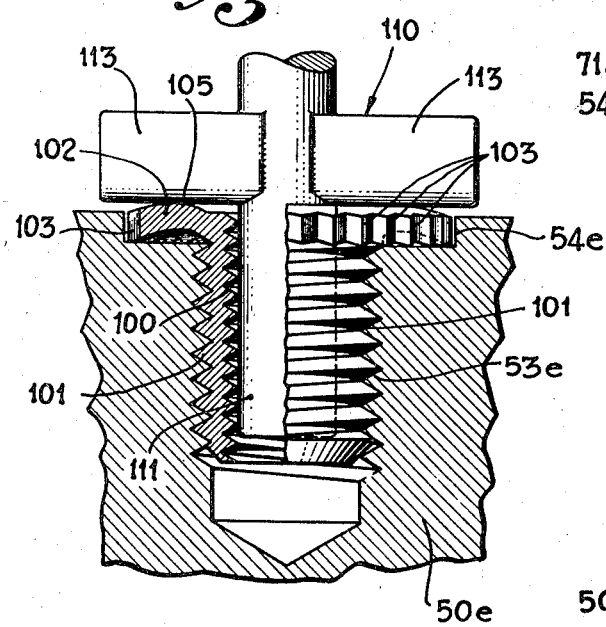
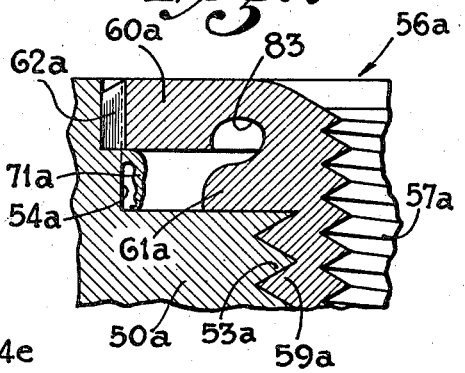
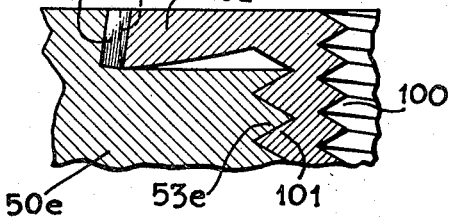

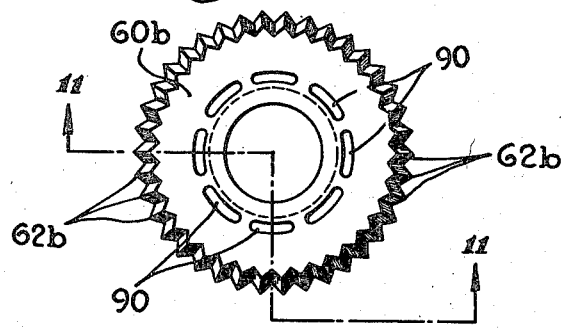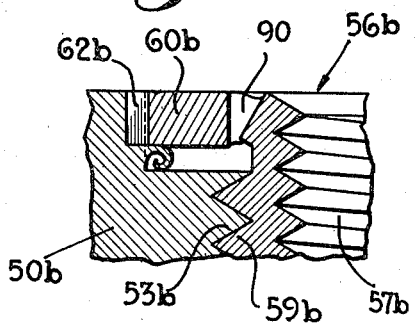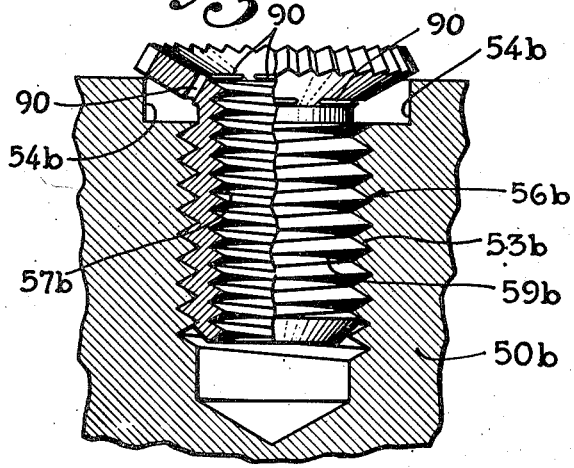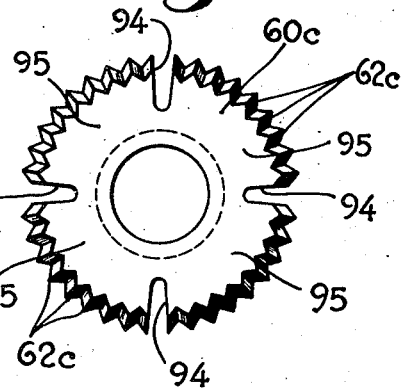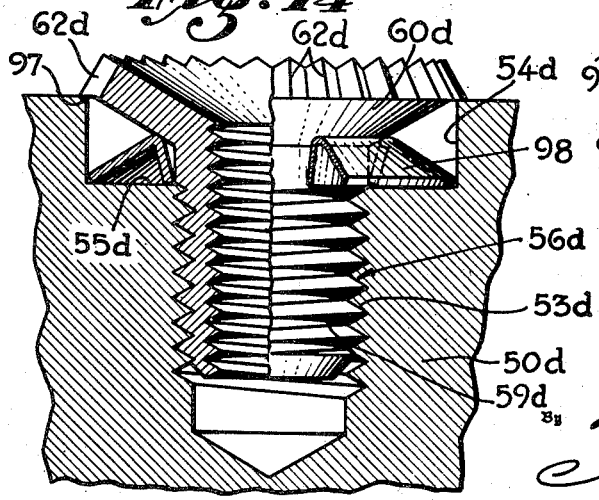

Patented June 29, 1948

2,444,145

UNITED STATES PATENT OFFICE 2,444,145

INSERT AND USE OF SAME

Joseph Rosan, North Hollywood, Calif.

Application May 24, 1943, Serial No. 488,169

14 Claims. (Cl. 29—148)

This invention relates generally to inserts designed for anchorage in bores of bodies of relatively soft materials, for such typical purposes as making various connections with such bodies, as for instance providing a secure mounting for a screwthreaded stud in a body.

With the recent advent of widely extended use of many types of relatively soft bodies in construction, particularly in the aircraft industry, the problem of providing secure connections or anchorages to such bodies has become acute and has received much attention. Such relatively soft bodies as I have reference to include aluminum and magnesium alloys, plastics, woods, etc. Particularly in the case of aircraft construction, where the fastening is subject to constant vibratory action, assurance must be provided that the insert will not loosen and fail either by longitudinal displacement or by rotation.

The object of the present invention is to provide a simple, one-piece insert, of inexpensive construction, capable of forming a permanent anchorage in a relatively soft body for such a typical fastening element as a screwthreaded stud.

In accordance with a preferred form of the invention, the insert, which is designed for insertion and anchorage within a bored and counterbored body, embodies an externally screwthreaded cylindrical body receivable in and screwthreadedly engageable with the said bore. The insert body has at its outer end an integral flange, serrated on its periphery, and of an initial diameter such as may be readily received within the counterbore. This integral flange is adapted to be radially expanded, after the tubular body has been screwed home, to cause its periphery to engage and bite into the walls of the counterbore and thereby lock the device against rotation.

The present invention in several typical embodiments will now be described in detail, reference for this purpose being had to the accompanying drawings, in which:

Fig. 1 is a top plan view of another form of insert in accordance with the invention;

Fig. 2 is a section on broken-line 2—2 of Fig. 1, showing the insert partially installed in a body of relatively soft material;

Fig. 3 is an enlarged detail of a portion of Fig. 2;

Fig. 4 is an enlarged detail similar to Fig. 3, but showing the insert in its final locking position;

Fig. 5 shows a modified form of insert in accordance with the invention, the view being taken in an aspect similar to Fig. 6;

Figs. 6 and 7 are detail views of a portion of the insert shown in Fig. 5 and showing the locking flange before and after deflection into locking position;

Fig. 8 is a view, with a quarter-section removed, of another form of insert in accordance with the invention, and showing also a spinning tool employed in installing same;

Fig. 9 is a detail view showing the locking flange after deflection into locking position;

Fig. 10 is a plan view of another modified form of the invention;

Fig. 11 is a section on line 11—11 of Fig. 10;

Fig. 12 is a detail of a portion of the insert of Figs. 10 and 11, showing the locking flange in locking position;

Fig. 13 is a plan view of another modified form of the invention; and

Fig. 14 is a view, with a longitudinal quarter-section removed, of another modified form of the invention.

Reference being had to Figs. 1 to 4, numeral 50 designates generally a body of relatively soft material, such as aluminum or magnesium alloy, plastic, or the like, having an outer surface 51. When I speak of a body of relatively soft material, it will be understood of course that I refer to a body which is of a material softer than that of the insert. The insert is constructed of some suitable relatively hard material such as mild or heat-treated steel, brass, bronze, etc. As illustrated, the body 50 is formed with a screwthreaded bore 53, extending inwardly from outer surface 51, and with an enlarged counterbore 54, extending inwardly from surface 51 to a predetermined depth, said counterbore 54 affording an outwardly facing annular shoulder 55 at its juncture with bore 53.

The insert body, in this instance of generally tubular form, is designated generally by numeral 56, and is provided preferably with a central longitudinal screwthreaded bore 57, adapted to receive a screwthreaded stud or the like. The insert body has an inner or forward portion or section 58 having external screwthreads 59 adapted for engagement with screwthreaded bore 53, and with an outer or rearward head portion including an integral annular flange or annulus 60 initially extending rearwardly and outwardly from its rearward end portion at an angle of about 30°, or about as typically illustrated in Figs. 2 and 3 of the drawings. The head or rearward end portion of the insert body also preferably includes an annular outwardly extending flange 61 receivable in said counterbore 54 and adapted to seat against counterbore shoulder 55 when the insert is screwed home in bore 53. The parts are so dimensioned that when flange 61 is seated on shoulder 55, the upper or rearward end of the insert body is preferably flush with the surface 51 of body 50. At the same time, the peripheral or rim portion of the flange 60 is above the surface 51 and may partially overhang or extend radially outwardly beyond the wall surface defining the counterbore 54. This peripheral or rim portion of the flange 60 comprises a multiplicity of serrations 62. In the specific embodiment illustrated in Figs. 2 and 3, the lines 63 at the bottoms of the valleys or dihedral angles between the individual serrations are parallel to the central axis of the insert body when the flange 60 is in the initial position of Figs. 2 and 3. The undersides of the serrations are defined by inner surfaces 64 forming continuations of the undersides of the flange 60, intersected by outer surfaces 65 formed in a plane initially at substantially right angles to the central axis of the insert (Fig. 3); also, the ridges of the serrations are formed substantially at right angles to the flanges 60, so that each such ridge has a substantially triangular face 66, with its apex down. The individual serrations 62 as so formed are effective cutting tools, adapted to cut or broach grooves in the material of the body 50 upon downward deflection of the flange 60 from the position illustrated in Figs. 2 and 3.

The insert having been screwed into the position shown in Figs. 2 and 3, it is then locked in position in the body 50 by deflecting or bending the flange 60 from the position of Fig. 3 to the position of Fig. 4. This may be accomplished by any appropriate means or method of applying pressure to flange 60. Any appropriate or suitable drive tool or hammer may be employed, or the flange may be deflected by a spinning operation, employing a spinning tool of a general type such as is illustrated in 12, and described hereinafter. To facilitate the deflection of the flange 60, it may be shaped or weakened in various ways; in Fig. 3, for example, the flange is for this purpose shown as provided on its upper surface with a groove or channel 70 located near its juncture with the insert body proper. The weakened section resulting encourages deflection or bending of the flange in the region near the insert body, and permits the flange to be readily depressed to the position of Fig. 8.

In the course of the described deflection of the flange 60 from the position of Fig. 3 to the position of Fig. 4, the serrations 62 bite into the material 50 around the counterbore 54, cutting or broaching grooves therein, and removing chips from the material, as indicated at 71 in Fig. 4. The insert is thus securely locked in the material of the body 50, the screwthreads on its inner portion locking it against longitudinal displacement, and the serrations 62 on its outer portion securing it against torsional displacement. The function of the flange 61 seating on the shoulder 55 is to support the insert body extending inwardly therefrom in a solid and positive manner during the hammering of the flange 60 from the position of Fig. 3 to locked-in position of Fig. 4, thereby eliminating the impact that would otherwise be transmitted from the external screwthreads of the insert body to the body of relatively soft material 50. Without such protection, the hammering action incident to the deflection of the flange 60 may tend to loosen the threads 59 in the screwthreaded bore 53.

Figs. 5, 6 and 7 show a somewhat modified form of the device illustrated in Figs. 1 to 4. For convenience, members of the embodiment of Figs. 5 to 7 corresponding to members of the embodiment of Figs. 1 to 4 are identified by like numerals but with the sub-letter $a$ annexed. The body 50a again has a screwthreaded bore 53a and an enlarged counterbore 54a, and the insert body, designated generally by numeral 56a, has a central screwthreaded bore 57a, an inner portion or section 58a having external screwthreads 59a adapted for engagement with screwthreaded bore 53a, and has an outer or head portion including an annular flange or annulus 60a initially extending upwardly and outwardly from its outer end at such an angle as typically illustrated in Figs. 5 and 6 of the drawings. The head or outer end portion of the insert body also preferably includes an annular outwardly extending flange 61a receivable in the counterbore 54a and adapted to seat against the inner end of the counterbore when the insert is screwed home. The flange 61a is of somewhat smaller diameter than the flange 61 of the previously-described embodiment, being only of sufficient diameter to assure a good support for the insert body on the shoulder at 55a.

The periphery of the flange 60a has serrations 62a. The ridge lines 80 of these serrations 62a, and also the lines 81 at the bottoms of the valleys or dihedral angles between the individual serrations, are in this instance formed preferably at substantially right angles to the flange 60a, and are in planes passing through the central longitudinal axis of the tubular insert body.

To facilitate the deflection of the flange 60a, it is here shown as weakened at a point near its juncture with the insert body proper by the provision of a channel or groove 83 on its under side.

The insert body having been screwed into the position shown in Figs. 9 and 10, it is then locked in position in the body 60a by deflecting the flange 60a from the position of Figs. 5 and 6 to the position of Fig. 7. Again, any appropriate means or method of applying pressure to the flange to accomplish this end may be employed. As the flange is deflected from the position of Fig. 6 to the position of Fig. 7, the serrations 62a bite into the material 50a around the counterbore 54a, cutting or broaching grooves therein, and removing chips, as indicated at 71a in Fig. 7.

In Figs. 10, 11 and 12 is illustrated an embodiment of the invention similar to that appearing in Figs. 5, 6 and 7, and whose parts are indicated by the same reference numerals as have been applied to the form of Figs. 5 to 7, but with the sub-letter $b$ substituted for the sub-letter $a$. The principal modification illustrated in Figs. 10 through 12 is the use of elongated slots 90 formed in the flange 60b at its base or root section, so as to encourage or facilitate deflection of the flange from the initial position of Fig. 11 to the locked-in position of Fig. 12.

Fig. 13 is a plan view of an insert of modified construction, which may again be regarded as of the general type as disclosed in Figs. 5 to 7, but with a modified means for encouraging or facilitating the deflection of the flange, designated in this instance by the numeral 60c. It will of course be understood that this flange 60c initially extends upwardly and outwardly from an internally and externally screwthreaded body, of the same general type as appears in, for instance, Figs. 5 to 7. The flange 60c, provided with the usual peripheral serrations 62c, is in this instance formed with radial slots 94 extending inwardly from its serrated periphery to a point adjacent the region of juncture with the tubular portion of the insert body proper. These slots or notches 94 sever the flange into a number of projecting parts 95, which may be deflected with somewhat increased facility as compared with a complete, unbroken flange.

Fig. 14 illustrates one further expedient in accordance with the invention designed to facilitate deflection of the flange and at the same time to relieve the threads from the full effect of the impacts incident to the bending of the flange downwardly into locking position. Excepting for omission of the flange 61a and of the weakness groove 83, the insert of Fig. 14 is in general respects similar to the insert of Figs. 5 to 7, and its parts will accordingly be designated by similar reference numerals, but with the use of the sub-letter d in the case of Fig. 14. A slightly modified form of serration is disclosed in Fig. 14, the serrations 62d being extended downwardly slightly below the plane of the undersurface of the flange 60d, and the undersides of the serrations being raked somewhat, is indicated at 97, to facilitate the cutting action of the serrations as they are driven into the material of the body 50d. A washer 98 is placed on the shoulder 55d at the bottom of counterbore 54d, and is so formed as to engage the underside of the flange 60d at a point near the juncture of the latter with the outer end portion of the insert body proper. The position of the flange 60d after being bent downwardly into locking engagement with the body 50d, is not illustrated in the drawings, but will be understood to be similar to that shown for instance in Fig. 4. As the flange 60d is so bent downwardly, it tends to fulcrum on the washer 98, thus facilitating the bending action, and at the same time, the washer 98 supports the flange 60d from the shoulder 55d, and so reduces the transference of the impacts incident to the hammering of the flange 60d into its final locking position, downwardly to the threaded connection between the insert body and the body of material 50d.

Figs. 8 and 9 illustrate a further modified form of insert within the scope of the invention, and also illustrate the use of a spinning operation for deflection of the locking flange, which spinning operation is also applicable to the embodiments of Figs. 1-7. The body into which the insert is to be installed is designated generally by numeral 50e, and said body has the usual screwthreaded bore 53e, and counterbore 54e, though the latter is typically somewhat shallower than is the case in the earlier described embodiments of the invention. The insert body is of generally tubular form, having a central screwthreaded bore 100 and an inner externally screwthreaded section 101 adapted for screwthreaded engagement with the bore 53e. The outer end portion of the tubular insert body has an annular outwardly extending head flange 102, the peripheral edge of which is formed with serrations 103, extended in directions parallel to the central axis of the tubular insert body. The flange 102 has an initial upward arch or convexity 105 as seen in radial section, its root and serrated periphery being initially substantially in the same transverse plane, and the flange is of such diameter that its serrations 103 are initially freely receivable within counterbore 54e.

The insert having been screwed into the position shown in Fig. 8, it is then locked in position in the body 50e by spreading or expanding the flange 102 sufficiently to force the serrations 103 into biting engagement with the counterbore 54e, and this is accomplished by flattening the bowed flange by exerting downward pressure upon it. Fig. 9 shows the flange 102 after having been so flattened, and illustrates the serrations 103 as having been forced well inside the material of the body 50e around the counterbore 54e. This flattening of the flange 102 may be accomplished by any appropriate means or method of applying the necessary pressure thereto. Any appropriate drive tool or hammer may be employed, or the flange may be flattened by a spinning operation, employing a spinning tool 110 of the general type shown in Fig. 8. This spinning tool typically comprises a central shaft 111, which is receivable inside the central bore of the tubular insert body, and which is adapted to be rotated by any suitable or usual power-driven means, not illustrated, and two arms or wings 113 extending oppositely from the shaft 111, which arms are adapted to engage the upwardly bowed flange 102. By exerting downward pressure on this spinning tool as it is rapidly rotated, the initial bowed profile of the flange is readily removed and the flange flattened out to the position illustrated in Fig. 9, with its peripheral serrations 102 forced into biting engagement with the body 50. Such a spinning operation is often superior to a hammering or impact operation, for the reason that it is relatively difficult to accomplish a uniform deflection or expansion of the flange by a hammering operation, whereas uniform movement of the metal of the flange is very readily obtained by the described spinning operation.

It will be evident that the serrated flanges of the types of inserts disclosed in Figs. 1-7 may also be deflected into locking position by similar spinning operations. A spinning tool similar to that shown in Fig. 8 may be employed for this purpose, and by exerting downward pressure thereon as it is rotated, the flange is gradually and uniformly moved down into the desired locking position.

From the above description of several typical illustrative forms of the invention, the underlying principles thereof will be readily gathered. It is of course to be understood, however, that the particular embodiments of the invention herein disclosed are for illustrative purposes only, and that various changes in design, structure and arrangement may be made therein without departing from the spirit and scope of the invention or of the appended claims.

I claim:

1. A one-piece insert adapted for insertion and anchorage within a bored and counter bored body of relatively soft material, comprising an externally and internally screwthreaded tubular body receivable in and screwthreadedly engageable with the bore in said body of material, an integral bendable flange on the rearward portion of said insert body having broaching serrations on its periphery and adapted to be bent in a direction to enlarge its diameter after said insert is screwed into said bore to force said serrations into biting engagement with said body of material around said counterbore, and another integral flange on said insert body located inwardly along the insert body from the first-mentioned flange and engageable with the bottom of said counterbore when the insert body is screwed home in said bore in said body of material.

2. A one-piece insert adapted for insertion and anchorage within a bored and counter bored body of relatively soft material, comprising an externally screwthreaded cylindrical body receivable in and screwthreadedly engageable with the bore in said body of material, an integral, initially outwardly inclined conical flange on the outer portion of said insert body having serrations on its periphery and adapted to be deflected into a plane substantially at right angles to the central longitudinal axis of said insert body after said insert is screwed into said bore to force said serrations into biting engagement with said body of material around said counterbore, and another integral flange on said insert body located inwardly along the insert body from the first-mentioned flange and engageable with the bottom of said counterbore when the insert body is screwed home in said bore in said body of material.

3. A one-piece insert adapted for insertion and anchorage within a bored and counter bored body of relatively soft material, comprising an externally screw threaded cylindrical body receivable in and screwthreadedly engageable with the bore in said body of material, and an integral, initially outwardly inclined conical flange on the outer portion of said insert body having serrations on its periphery and adapted to be deflected into a plane substantially at right angles to the central longitudinal axis of said insert body after said insert is screwed into said bore to force said serrations into biting engagement with said body of material around said counterbore, said flange having a weakened section near its point of juncture with said insert body to facilitate said deflection.

4. A one-piece insert adapted for insertion and anchorage within a bored and counter bored body of relatively soft material, comprising an externally screwthreaded cylindrical body receivable in and screwthreadedly engageable with the bore in said body of material, an integral flange on the outer portion of said insert body having serrations on its periphery and adapted for deflection after said insert is screwed into said bore to force said serrations into biting engagement with said body of material around said counterbore, said flange having a weakened section near its point of juncture with said insert body to facilitate said deflection, and another integral flange on said insert body located inwardly along the insert body from the first-mentioned flange and engageable with the bottom of said counterbore when the insert body is screwed home in said bore in said body of material.

5. A lock-type insert formed of metal and having a forwardly-extending tubular body providing external threads for threaded engagement with a bore of a receiving member, the rear portion of said tubular body flaring outwardly and rearwardly to provide a flange flaring at an angle in the neighborhood of 60° relative to the axis of said tubular body, the outer portion of said flange providing a roughened peripheral surface tapering inwardly and rearwardly, said flange being deformable into a more radial position of larger peripheral size when pressure is applied thereto in a forward direction.

6. A one-piece insert adapted for insertion and anchorage within a bored and counter bored body of relatively soft material, comprising an externally screwthreaded cylindrical body receivable in and screwthreadedly engageable with the bore in said body of material, a screwthreaded socket in said body opening through the rearward end portion thereof, and an integral, initially rearwardly flared conical flange on the rearward end portion of said insert body having serrations on its periphery and adapted to be deflected into a plane substantially at right angles to the central longitudinal axis of said insert body after said insert is screwed into said bore to force said serrations into biting engagement with said body of material around said counterbore.

7. A one-piece insert adapted for insertion and anchorage within a bored and counter bored body of relatively soft material, comprising an externally screwthreaded cylindrical body receivable in and screwthreadedly engageable with the bore in said body of material, a screw threaded socket in said body opening through the rearward end portion thereof and an integral flange on the outer extremity of said insert body having serrations on its periphery, said flange having its root and its serrated periphery initially substantially in the same plane transverse of the body, and being formed in a radially extending arch between said root and periphery, said serrated flange being initially receivable within said counterbore, and being adapted to be flattened into said transverse plane after said insert has been screwed to its intended depth to enlarge its diameter and thereby force said serrations into biting engagement with said body of material around said counterbore.

8. A one-piece insert adapted for insertion and anchorage within a bored and counterbored body of relatively soft material, comprising a cylindrical body, an initially rearwardly flared conical flange of circular outline integrally joined to said body near one extremity of said body, said flange having peripheral serrations, and being radially expansible by transverse bending independent of movement of said body, screw threads on the exterior of said body between said flange and the other extremity of said body, said screw threads being engageable with said bore in said body of material, and said flange being radially expansible after said body is screwed into said bore in order to force said serrations into the wall of said counterbore, and a screw threaded surface on said body accessible on the opposite side of said flange from the first-mentioned threads on said body for attachment of external fastening means.

9. A one-piece insert adapted for insertion and anchorage within a bored and counterbored body of relatively soft material, comprising a cylindrical body, a flange of circular outline integrally joined to said body near one extremity thereof and having peripheral serrations, said flange having its root and its serrated periphery initially substantially in the same plane transverse of the body and being formed in a radially extending arch between said root and said periphery, said flange being initially receivable within said counter-bore and expansible by the application of force to flatten said arch, screw threads on the exterior of said body between said flange and the other extremity of the body, said screw threads being engageable with said bore in said body of material and said flange being radially expansible after said body is screwed into said bore in order to force said serrations into the wall of said counter-bore, and a screw threaded surface on said body accessible on the opposite side of said flange from the first-mentioned threads on said body for attachment of external fastening means.

10. The method of installing in a bored and counterbored body of relatively soft material, an insert comprising a cylindrical externally screw threaded body having adjacent one end a locking flange with a serrated periphery, which comprises: screwing said insert into the bore of the body of material and thereafter displacing said flange by the application of pressure thereto, to force the peripheral serrations to bite into said body of material around said counter-bore.

11. The method of installing, in a bored and counterbored body of relatively soft material, an insert comprising a cylindrical externally screw threaded body having adjacent one end an outwardly inclined conical locking flange with a serrated periphery, which comprises: screwing said insert body into the bore in said body of material, and then applying pressure to said flange to uniformly deflect it into a plane at right angles to the longitudinal axis of said insert body and to force said serrations to bite into said body of material around said counterbore.

12. The method of installing, in a bored and counterbored body of relatively soft material, an insert comprising a cylindrical externally screw threaded body having adjacent one end a locking flange with a serrated periphery which comprises: screwing said insert body into the bore in said body of material, and thereafter radially expanding said flange to force its serrations to bite into said body of material around said counterbore.

13. The method of installing, in a bored and counterbored body of relatively soft material, an insert comprising a cylindrical externally screw threaded body having adjacent one end a locking flange with a serrated periphery, said flange having its root and its periphery initially in the same plane transverse of the insert body and being formed in a radially extending arch between said root and periphery, which comprises: screwing said insert into the bore in the body of material and thereby positioning the flange in said counterbore, and applying axial force to the flange to flatten said arch and to expand the flange radially to force its serrations to bite into said body of material surrounding said counterbore.

14. A one-piece insert adapted for insertion and anchorage within a bored and counterbored body of material, said insert comprising: an externally screw threaded shank adapted to be screw threaded into said bore; and an integral flange at the rearward extremity of said insert and equipped with serrations in its periphery, said flange being initially conical in form and having a weakened region at its juncture with said shank, adapted to permit said flange to flatten into a planar form upon axial compression to expand radially to force said serrations into the walls of surrounding material.

JOSEPH ROSAN.

REFERENCES CITED

The following references are of record in the file of this patent:

UNITED STATES PATENTS

| Number | Name | Date |
|---|---|---|
| 824,983 | Farrington | July 3, 1906 |
| 1,619,569 | Dedouch | Mar. 1, 1927 |
| 1,795,570 | Nilson | Mar. 10, 1931 |
| 1,875,930 | Martin | Sept. 6, 1932 |
| 2,002,741 | Hunt | May 28, 1935 |
| 2,083,831 | Cozzens | June 15, 1937 |

FOREIGN PATENTS

| Number | Country | Date |
|---|---|---|
| 170,868 | Great Britain | Oct. 24, 1921 |
| 464,298 | Great Britain | Apr. 15, 1947 |
| 276,786 | Great Britain | Sept. 8, 1927 |
| 2,136,523 | Great Britain | Nov. 15, 1938 |